(12) United States Patent
Brodeur (10) Patent No.: US 11,046,448 B2
(45) Date of Patent: Jun. 29, 2021

(54) ENGINE COOLING SYSTEMS FOR AIRCRAFT

(71) Applicant: Textron Innovations Inc., Providence, RI (US)

(72) Inventor: Nicholas Brodeur, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 521 days.

(21) Appl. No.: 15/384,495

(22) Filed: Dec. 20, 2016

(65) Prior Publication Data

US 2018/0170569 A1 Jun. 21, 2018

(51) Int. Cl.
| | |
|---|---|
| *B64D 33/08* | (2006.01) |
| *B64D 27/08* | (2006.01) |
| *B64D 27/14* | (2006.01) |
| *F01P 3/20* | (2006.01) |
| *F01P 7/16* | (2006.01) |
| *F15B 21/0423* | (2019.01) |
| *F01P 5/12* | (2006.01) |

(Continued)

(52) U.S. Cl.
CPC ............ *B64D 33/08* (2013.01); *B64D 27/08* (2013.01); *B64D 27/14* (2013.01); *F01P 3/20* (2013.01); *F01P 7/16* (2013.01); *F15B 21/0423* (2019.01); *B64C 27/00* (2013.01); *B64C 29/0025* (2013.01); *B64D 35/02* (2013.01); *F01P 5/12* (2013.01); *F01P 11/12* (2013.01); *F01P 11/18* (2013.01); *F01P 2003/006* (2013.01); *F01P 2007/146* (2013.01); *F01P 2050/20* (2013.01); *F15B 2211/20523* (2013.01); *F15B 2211/611* (2013.01); *F15B 2211/62* (2013.01); *F15B 2211/7058* (2013.01)

(58) Field of Classification Search
CPC ........ B64D 27/08; B64D 27/14; B64D 33/08; B64D 35/04
See application file for complete search history.

(56) References Cited

U.S. PATENT DOCUMENTS

| | | | | |
|---|---|---|---|---|
| 3,000,593 A | * | 9/1961 | Haberkorn | ............... B64D 5/00 244/2 |
| 3,211,399 A | * | 10/1965 | Eickmann | ............... B64C 11/00 244/17.23 |

(Continued)

FOREIGN PATENT DOCUMENTS

| | | |
|---|---|---|
| JP | 2002227645 A | 8/2002 |
| WO | 2012003939 A1 | 1/2012 |

OTHER PUBLICATIONS

European Exam Report; Application No. 17200687.6; European Patent Office; dated Jun. 7, 2018.

(Continued)

*Primary Examiner* — Michael H Wang
(74) *Attorney, Agent, or Firm* — Lawrence Youst PLLC (57) ABSTRACT

An engine cooling system for a rotorcraft includes an engine having an engine cooling circuit, a hydraulic pump powered by the engine to pump hydraulic fluid, and a hydraulic circuit in fluid communication with the hydraulic pump and the engine cooling circuit, the hydraulic circuit including at least one hydraulic-powered component. The hydraulic pump is adapted to pump the hydraulic fluid through both the hydraulic circuit and the engine cooling circuit, thereby cooling the engine.

14 Claims, 3 Drawing Sheets

(51) Int. Cl.
*F01P 11/12* (2006.01)
*F01P 11/18* (2006.01)
*F01P 7/14* (2006.01)
*F01P 3/00* (2006.01)
*B64C 29/00* (2006.01)
*B64C 27/00* (2006.01)
*B64D 35/02* (2006.01)

(56) References Cited

U.S. PATENT DOCUMENTS

| | | | | |
|---|---|---|---|---|
| 3,350,035 A * | 10/1967 | Schlieben | ............... | B64C 29/02 244/7 R |
| 3,465,538 A * | 9/1969 | Wunder | ............... | F01P 7/044 62/184 |
| 3,823,898 A * | 7/1974 | Eickmann | ............... | B64C 11/28 244/12.1 |
| 5,121,714 A * | 6/1992 | Susa | ............... | F01P 7/165 123/41.1 |
| 5,165,377 A * | 11/1992 | Hosseini | ............... | F01P 7/044 123/41.12 |
| 5,531,190 A * | 7/1996 | Mork | ............... | F01P 7/044 123/41.12 |
| 5,579,728 A * | 12/1996 | Gotmalm | ............... | F01P 3/20 123/41.01 |
| 5,692,460 A * | 12/1997 | Froeschl | ............... | F01P 7/167 123/41.1 |
| 6,179,247 B1 * | 1/2001 | Milde, Jr. | ............... | B64C 29/00 244/23 A |
| 6,343,573 B1 * | 2/2002 | Takahashi | ............... | F01P 7/167 123/41.08 |
| 6,848,255 B2 * | 2/2005 | Chiaramonte | ............... | F01P 7/044 60/456 |
| 7,011,050 B2 * | 3/2006 | Suda | ............... | F01P 7/167 123/41.09 |
| 7,263,954 B2 * | 9/2007 | Piddock | ............... | F01P 7/167 123/41.09 |
| 8,192,882 B2 * | 6/2012 | Stolte | ............... | B64D 41/00 429/434 |
| 8,851,026 B2 * | 10/2014 | Brinkmann | ............... | F01P 11/0285 123/41.08 |
| 8,955,797 B2 * | 2/2015 | Buono | ............... | B64C 27/10 244/53 R |
| 2012/0012692 A1 * | 1/2012 | Kroo | ............... | B64C 3/56 244/6 |
| 2018/0016022 A1 * | 1/2018 | Ljung | ............... | B64C 39/024 |

OTHER PUBLICATIONS

European Search Report; Application No. 17200687.6; European Patent Office; dated Mar. 27, 2018.
Canadian Office Action, Application No. 2,984,534, CIPO, dated Aug. 24, 2018.

* cited by examiner

ENGINE COOLING SYSTEMS FOR AIRCRAFT

TECHNICAL FIELD OF THE DISCLOSURE

The present disclosure relates, in general, to engine cooling systems for use on aircraft and, in particular, to engine cooling systems that utilize a hydraulic circuit and associated components of an aircraft to cool the engine.

BACKGROUND

Aircraft engines can produce a significant amount of heat during operation, which causes the engine to rise in temperature. Heat must be directed away from the engine to regulate engine temperature, increase engine life and prevent engine damage. Most aircraft include an engine cooling system to perform this function. Aircraft engines may be cooled by air, cooling liquid, lubrication or some combination thereof. Engine cooling systems, however, can add significant additional weight, complexity and cost to the aircraft. For example, aircraft that utilize an internal combustion engine cooled by a cooling liquid may require a water pump dedicated only to supplying water to the engine cooling circuit running through the engine. Many aircraft utilize auxiliary systems for specific purposes but fail to utilize such auxiliary systems in other operations for which such auxiliary systems may be suitable, thus missing an opportunity to use existing aircraft components to achieve multiple aircraft requirements. Accordingly, a need has arisen for an improved engine cooling system that does not utilize a stand alone engine cooling system but instead utilizes existing components of an aircraft to cool the engine, thereby lowering the weight, complexity and cost of the engine cooling system when compared to current engine cooling techniques.

SUMMARY

In a first aspect, the present disclosure is directed to an engine cooling system for a rotorcraft including an engine having an engine cooling circuit, a hydraulic pump powered by the engine to pump hydraulic fluid, and a hydraulic circuit in fluid communication with the hydraulic pump and the engine cooling circuit, the hydraulic circuit including at least one hydraulic-powered component. The hydraulic pump is adapted to pump the hydraulic fluid through both the hydraulic circuit and the engine cooling circuit, thereby cooling the engine.

In some embodiments, the engine may be an internal combustion engine. In certain embodiments, the at least one hydraulic-powered component may include at least one hydraulic propulsion system each including a hydraulic motor and a propeller, the hydraulic motor operable to provide rotational energy to the propeller. In some embodiments, the engine cooling circuit may be downstream from the hydraulic circuit. In certain embodiments, the hydraulic pump may be adapted to selectively pump the hydraulic fluid through the hydraulic circuit, and the engine cooling system may include a bypass assembly including a hydraulic switch and a bypass conduit. In such embodiments, the hydraulic switch may be fluidly interposed between the hydraulic pump and the hydraulic circuit, and the hydraulic switch may be movable between a plurality of switch positions including a bypass switch position to direct the hydraulic fluid into the bypass conduit to bypass the hydraulic circuit.

In some embodiments, the engine cooling system may include a conduit split upstream from the engine cooling circuit, the conduit split directing the hydraulic fluid to a pre-engine cooling circuit conduit and/or a reservoir return conduit. In such embodiments, the engine cooling circuit may be adapted to receive the hydraulic fluid at a predetermined hydraulic fluid pressure, and hydraulic fluid pressure in excess of the predetermined hydraulic fluid pressure may be directed toward the reservoir return conduit. In certain embodiments, the engine cooling system may include a thermostat upstream of the engine cooling circuit, the thermostat operable to monitor a temperature of the engine and control a flow of the hydraulic fluid into the engine cooling circuit based on the temperature. In some embodiments, the engine cooling system may include a filter upstream of the engine cooling circuit, the filter operable to filter the hydraulic fluid entering the engine cooling circuit.

In certain embodiments, the engine cooling system may include a heat exchanger upstream of the engine cooling circuit, the heat exchanger operable to cool the hydraulic fluid entering the engine cooling circuit. In some embodiments, the engine cooling system may include an orifice upstream of the engine cooling circuit, the orifice operable to control a pressure of the hydraulic fluid entering the engine cooling circuit. In certain embodiments, the orifice may be a pressure relief valve or a restrictor plate. In some embodiments, the engine cooling circuit may run in parallel to the hydraulic circuit. In certain embodiments, the hydraulic fluid may be an oil-based fluid. In certain embodiments, the engine cooling system may include a reservoir in fluid communication with the hydraulic pump, the reservoir operable to contain non-circulating hydraulic fluid. In some embodiments, the engine cooling system may include a heat exchanger downstream from the engine cooling circuit and upstream of the reservoir, the heat exchanger operable to cool the hydraulic fluid exiting the engine cooling circuit.

In a second aspect, the present disclosure is directed to an aircraft including a fuselage, at least one engine having an engine cooling circuit, a hydraulic pump powered by the at least one engine to pump hydraulic fluid, and a hydraulic circuit in fluid communication with the hydraulic pump and the engine cooling circuit, the hydraulic circuit including at least one hydraulic propulsion system. The hydraulic pump is adapted to pump the hydraulic fluid through both the hydraulic circuit and the engine cooling circuit, thereby cooling the at least one engine.

In some embodiments, the aircraft may be a rotorcraft having a distributed hydraulic propulsion system. For example, the rotorcraft may be a vertical takeoff and landing rotorcraft such as a closed wing rotorcraft that includes a closed wing surrounding the fuselage, the closed wing including the distributed hydraulic propulsion system. In certain embodiments, the distributed hydraulic propulsion system may include a plurality of hydraulic motors and propellers, wherein each of the hydraulic motors is operable to provide rotational energy to one of the propellers. In such embodiments, the distributed hydraulic propulsion system may include a hydraulic controller operate to regulate the speed of each of the hydraulic motors.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Figure 1A:
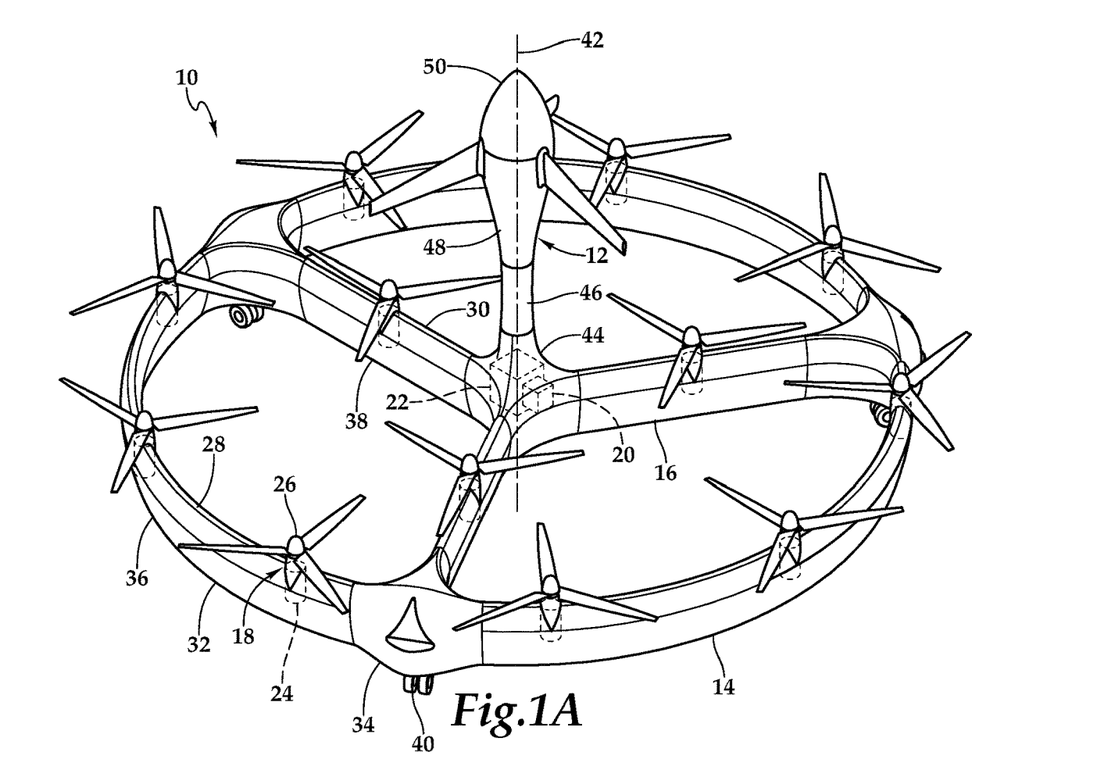
FIGS. 1A-1B are schematic illustrations of an exemplary rotorcraft utilizing an engine cooling system in accordance with embodiments of the present disclosure.
Figure 1B:
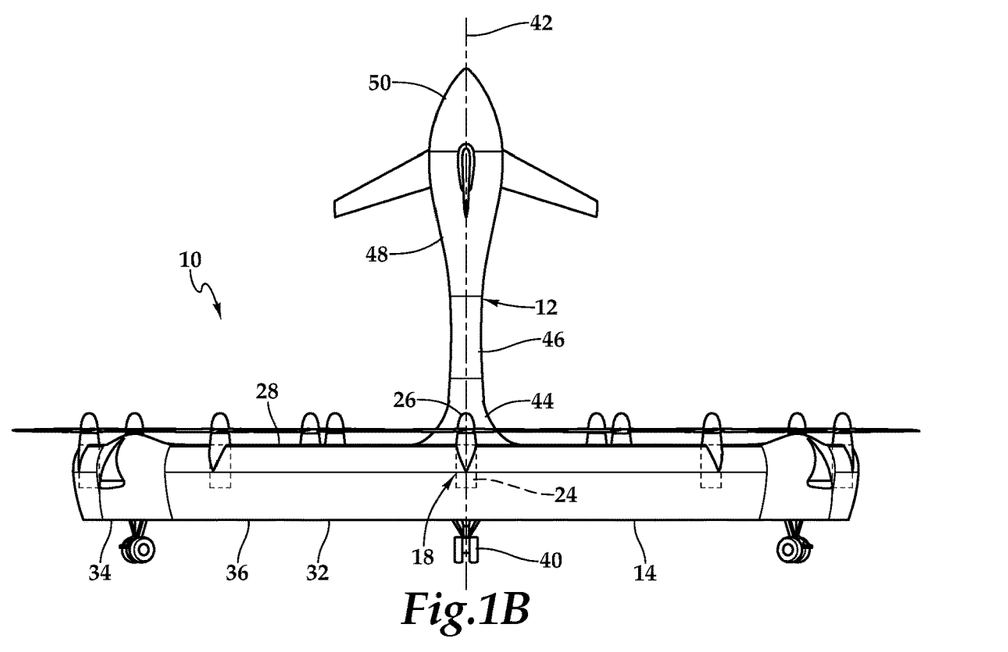

Referring to FIGS. 1A and 1B in the drawings, a rotorcraft is schematically illustrated and generally designated 10. Rotorcraft 10 includes a fuselage 12 and a closed wing 14 surrounding fuselage 12. Rotorcraft 10 includes one or more spokes 16 coupling fuselage 12 to closed wing 14. As used herein, the term "coupled" may include direct or indirect coupling by any means, including moving and/or non-moving mechanical connections. Rotorcraft 10 is capable of vertical takeoff and landing, hovering flight and forward flight. Rotorcraft 10 utilizes a distributed hydraulic propulsion system that includes hydraulic propulsion systems 18, to which hydraulic fluid is supplied by a hydraulic pump 20. Hydraulic pump 20 is powered by at least one engine 22. Engine 22 includes an engine cooling circuit that is fluidly coupled to a hydraulic circuit used to supply hydraulic fluid to hydraulic propulsion systems 18. Thus, hydraulic pump 20 pumps hydraulic fluid through both the hydraulic circuit, which includes hydraulic propulsion systems 18, and the engine cooling circuit in engine 22, thereby providing propulsion for rotorcraft 10 and cooling engine 22.

Engine 22 may be any type of engine capable of being cooled with a liquid. For example, engine 22 may be an internal combustion engine, such as a water-cooled internal combustion engine. In other embodiments, engine 22 may be any piston-based engine, a turboshaft engine or a lubrication-cooled engine. Unless otherwise indicated, as used herein, "or" does not require mutual exclusivity. In the illustrated embodiment, engine 22 is located at the base of fuselage 12. In other embodiments, engine 22 may be located anywhere on rotorcraft 10, including closed wing 14 or spokes 16. While the illustrated embodiment shows engine 22 as the sole power source for providing hydraulic fluid to hydraulic propulsion systems 18, in other embodiments, additional engines may be employed in any ratio to hydraulic propulsion systems 18, including a 1:1 ratio in which each hydraulic propulsion system 18 is powered by a respective engine 22.

Each hydraulic propulsion system 18 includes a hydraulic motor 24 and a propeller 26. Hydraulic motor 24 provides rotational energy to propeller 26 in response to being supplied with hydraulic fluid from hydraulic pump 20. In the illustrated embodiment, nine propellers 26 are disposed adjacent leading edge 28 of closed wing 14, and three propellers 26 are disposed adjacent leading edge 30 of spokes 16. In other embodiments, any number of hydraulic propulsion systems 18 may be utilized on rotorcraft 10. The distribution and number of propellers 26 may be selected to provide stability should one or more of hydraulic propulsion systems 18 fail. Propellers 26 may be variable speed constant pitch propellers. Hydraulic propulsion systems 18, including propellers 26, may also be pivotably mounted to closed wing 14 and/or spokes 16 to provide thrust vectoring to control pitch, roll or yaw moments. In other embodiments, propellers 26 may be capable of collective or cyclic pitch variation. Hydraulic motors 24 may be selected based on at least one of aerodynamics, propulsive efficiency, structural efficiency, aeroelasticity or weight of rotorcraft 10.

Closed wing 14 may include wing segments 32, which are connected to spokes 16 at wing-spoke junctions 34. Closed wing 14 may have a circular, oval, triangular, polygonal or any other shape suitable for the desired operational and aerodynamic requirements of rotorcraft 10. The cross-sectional shape of closed wing 14 between leading edge 28 and a trailing edge 36 may be an asymmetrical airfoil or any suitable aerodynamic shape. Likewise, the cross-sectional shape of spokes 16 between leading edge 30 and a trailing edge 38 may be an asymmetrical airfoil or any suitable aerodynamic shape. The number of spokes 16 may be determined, at least in part, by the shape and size of closed wing 14 and/or the shape, size and payload of fuselage 12. Fuselage 12, closed wing 14 and spokes 16 may be symmetrically shaped, as best shown in FIG. 1B, to provide a transition between vertical takeoff and landing, hovering flight and forward flight in any direction, although non-symmetrical shapes may also be utilized. Rotorcraft 10 also includes landing gear 40 operably coupled to closed wing 14. Landing gear 40 may be disposed proximate wing-spoke junctions 34, where additional structural support is provided. Landing gear 40 may be retractable into wing-spoke junctions 34.

Fuselage 12 may extend along an axis 42 that is substantially parallel to the rotational axis about which propellers 26 rotate. Fuselage 12 may include a rear section 44 substantially disposed at the center of closed wing 14 to provide a fuselage-spoke junction. Fuselage 12 may also include a middle section 46 connected to rear section 44, a front section 48 connected to middle section 46 and a nose section 50 connected to front section 48. Sections 44, 46, 48, 50 may be removably connected to one another in a modular fashion to provide a configurable function based on the mission or payload. The overall shape and length of fuselage 12 may vary depending on the desired mission flight characteristics. Middle section 46, front section 48 and nose section 50 may be capable of detaching, pivoting or retracting at least partially into one or more of the other sections for the storage or transport of rotorcraft 10. Sections 44, 46, 48, 50 may each be individually configured to be a cockpit module, a cabin module, an escape module, a payload module, a sensor module, a surveillance module, a power source module, a fuel module or any combination thereof. Nose section 50 may contain one or more parachutes. Rotorcraft 10 may be a manned or unmanned aircraft.

Closed wing 14 and spokes 16 provide lift and fuselage 12 points in the forward direction when rotorcraft 10 is in forward flight. Propellers 26 provide lift when rotorcraft 10 is in vertical takeoff and landing and hovering flight modes, and provide thrust when rotorcraft 10 is in forward flight. During forward flight, propellers 26 may be selectively feathered or operated in a low power mode since closed wing 14 and spokes 16 provide lift. One or more flight control surfaces may be disposed on or extend from closed wing 14, spokes 16 or fuselage 12 to provide improved control and flight characteristics. For example, yaw during vertical takeoff and landing mode and roll during hover mode may be controlled by trailing edge surfaces on spokes 16. The one or more flight control surfaces may include one or more airfoils, winglets, elevators or ailerons.

Rotorcraft 10 is a tail sitter that transitions between vertical takeoff and landing mode and forward flight mode without the need for any major physical reconfigurations. The individual rotor blades of propellers 26 may be folded forward or backward to reduce drag and provide increased speed and range. The circular shape of closed wing 14 may optimize propulsion, structural, aerodynamic and center of gravity requirements. Because rotorcraft 10 uses a distributed hydraulic propulsion system, gearboxes and drivetrains may be completely eliminated or substantially reduced. In embodiments in which propellers 26 are variable speed constant pitch propellers, propellers 26 need not be capable of collective and cyclic pitch variation, thereby reducing the complexity of each propeller.

It should be appreciated that rotorcraft 10 is merely illustrative of a variety of aircraft that can implement the embodiments disclosed herein. Indeed, the engine cooling system may be utilized on any aircraft having a hydraulic circuit. Other aircraft implementations can include hybrid aircraft, tiltrotor aircraft, tiltwing aircraft, quad tiltrotor aircraft, unmanned aircraft, gyrocopters, airplanes, jets, helicopters and the like. As such, those skilled in the art will recognize that the engine cooling system can be integrated into a variety of aircraft configurations. For example, while rotorcraft 10 utilizes a propeller-driven distributed hydraulic propulsion system, the engine cooling system may also be implemented on aircraft utilizing non-propeller thrust systems or provisions in lieu of, or in addition to, propellers. Such thrust systems or provisions may include ducted fans or thrusters. The engine cooling system may also be implemented on aircraft whose hydraulic circuit is not used for propulsion purposes. It should be appreciated that even though aircraft are particularly well-suited to implement the embodiments of the present disclosure, non-aircraft vehicles and devices can also implement the embodiments.

Figure 2:
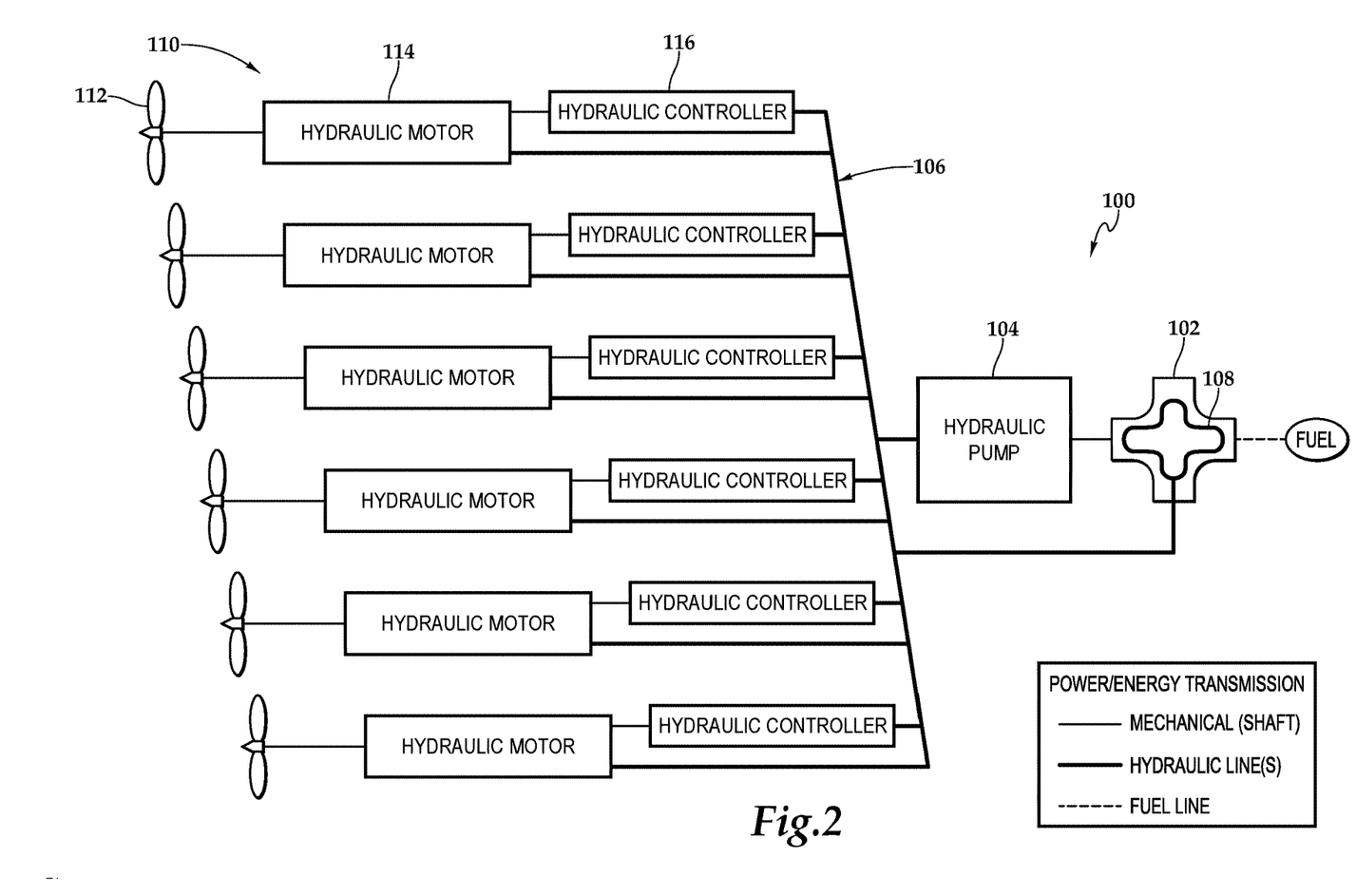
FIG. 2 is a schematic diagram of an engine cooling system in a distributed hydraulic propulsion rotorcraft in accordance with embodiments of the present disclosure.

Referring to FIG. 2 in the drawings, an engine cooling system implemented in a distributed hydraulic propulsion system is schematically illustrated and generally designated 100. Engine cooling system 100 includes at least one internal combustion engine 102, which powers hydraulic pump 104 to pump hydraulic fluid through both hydraulic circuit 106 and engine cooling circuit 108. The hydraulic fluid cools internal combustion engine 102 when flowing through engine cooling circuit 108. Hydraulic pump 104, hydraulic circuit 106 and engine cooling circuit 108 are in fluid communication with one another. Engine cooling circuit 108 may run in parallel to hydraulic circuit 106, thus allowing internal combustion engine 102 to be cooled by engine cooling circuit 108 at a rate that is fully or partially independent of hydraulic fluid flow through hydraulic circuit 106. The hydraulic fluid may be an oil-based fluid, such as mineral hydraulic fluid, synthetic-based hydraulic fluid or any type of hydraulic oil. In other embodiments, the hydraulic fluid may be a water-based fluid.

Hydraulic circuit 106 includes six hydraulic propulsion systems 110, although any number of hydraulic propulsion systems 110 may be utilized. Each hydraulic propulsion system 110 includes propeller 112, hydraulic motor 114 and hydraulic controller 116. Hydraulic pump 104 powers hydraulic motors 114 by pumping hydraulic fluid through hydraulic circuit 106. Hydraulic motor 114 provides rotational energy to propeller 112. In other embodiments, hydraulic propulsion systems 110 may also be non-propeller-based thrust systems or provisions, such as ducted fans or thrusters. Other types of hydraulic-powered components may also be included in hydraulic circuit 106, including both propulsive and non-propulsive hydraulic power components. Hydraulic controller 116 controls the speed of hydraulic motor 114 and propeller 112. For example, hydraulic controller 116 may regulate the amount of hydraulic fluid directed to hydraulic motor 114. One or more processors may be in data communication with hydraulic controllers 116 to independently control the operation and speed of each hydraulic motor 114. By virtue of being in fluid communication with hydraulic circuit 106, engine cooling circuit 108 is able to selectively utilize the hydraulic fluid being pumped by hydraulic pump 104 to power hydraulic propulsion systems 110, thereby cooling internal combustion engine 102 and eliminating the need for additional cooling components to be carried on the aircraft, thus reducing complexity, envelope, weight and cost.

Figure 3A:
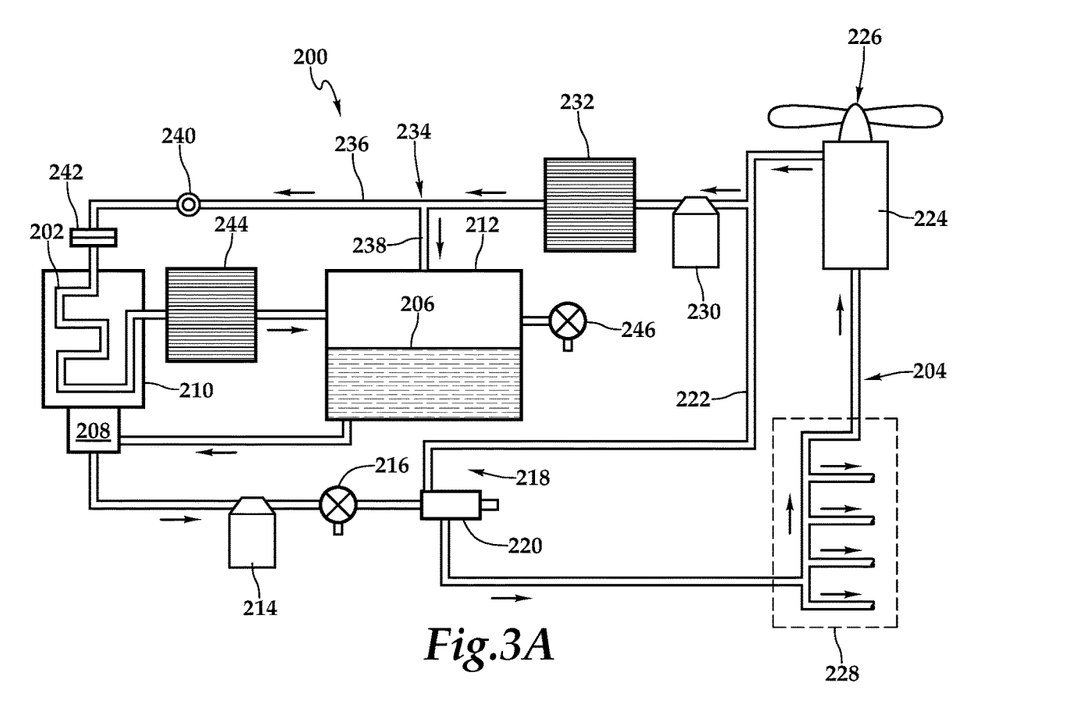
FIGS. 3A-3B are schematic diagrams of an engine cooling system in accordance with embodiments of the present disclosure.
Figure 3B:
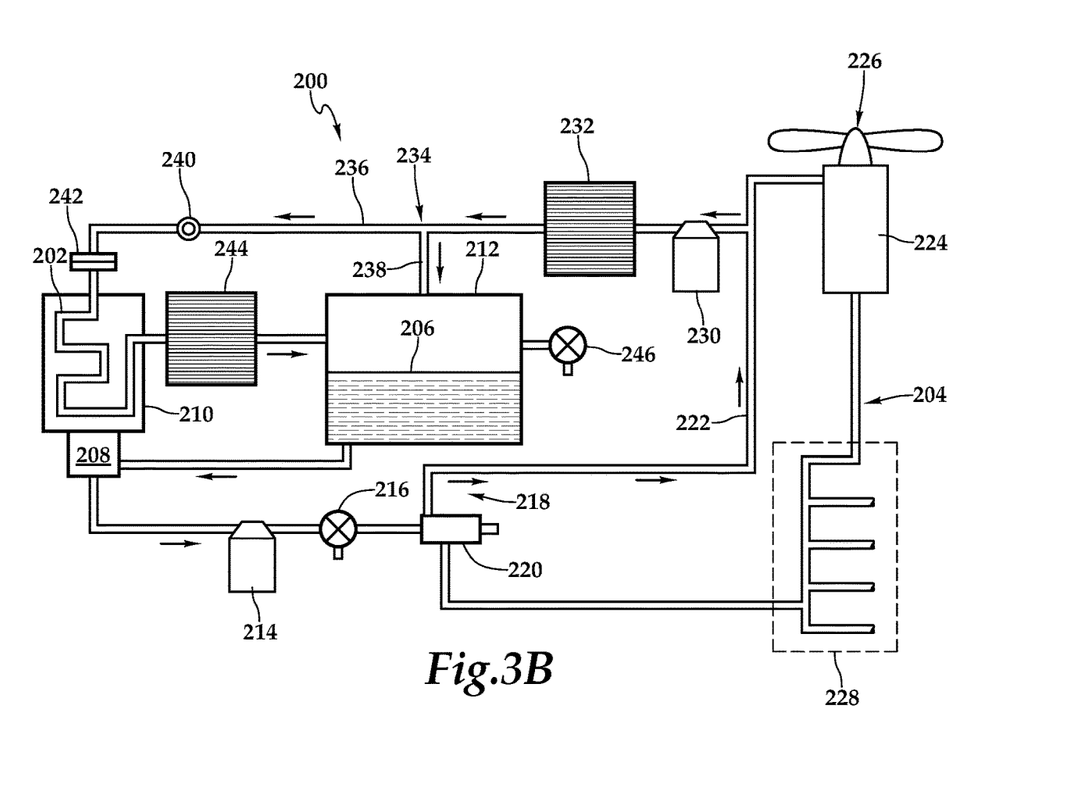

Referring to FIGS. 3A-3B in the drawings, an engine cooling system implemented in a distributed hydraulic propulsion system is schematically illustrated and generally designated 200. Engine cooling circuit 202 is in fluid communication with, and downstream from, hydraulic circuit 204 such that hydraulic fluid 206 pumped by hydraulic pump 208 both powers hydraulic-powered components in hydraulic circuit 204 and cools engine 210. Hydraulic pump 208, which is powered by engine 210, draws hydraulic fluid 206 from reservoir 212. Reservoir 212 is in fluid communication with hydraulic pump 208, and contains non-circulating hydraulic fluid 206. Hydraulic fluid 206 may enter hydraulic pump 208 at atmospheric pressure, and may exit hydraulic pump 208 at any pressure suitable to operate hydraulic circuit 204 and engine cooling circuit 202, such as 3000-4000 pound-force per square inch (PSI). Indeed, engine cooling system 200 may have any operating pressure. After passing through a filter 214, hydraulic fluid 206 passes through a pressure relief valve 216 in case hydraulic fluid 206 outputted by hydraulic pump 208 is over-pressurized.

Hydraulic pump 208 is capable of selectively pumping hydraulic fluid 206 through hydraulic circuit 204 by utilizing a bypass assembly 218. Bypass assembly 218 includes a hydraulic switch 220 and a bypass conduit 222. Hydraulic switch 220 is fluidly interposed between hydraulic pump 208 and hydraulic circuit 204. Hydraulic switch 220 is movable between two positions. In the first position, shown in FIG. 3A, hydraulic switch 220 directs hydraulic fluid 206 through hydraulic circuit 204 to hydraulic-powered components 224. In the second position, or bypass switch position, shown in FIG. 3B, hydraulic switch 220 directs hydraulic fluid 206 through bypass conduit 222 so that hydraulic circuit 204 is bypassed altogether. Bypass assembly 218 allows engine cooling circuit 202 to receive hydraulic fluid 206 whether or not hydraulic circuit 204 receives hydraulic fluid 206. In other embodiments, each hydraulic-powered component 224 may be associated with a respective switch so that each hydraulic-powered component may be individually turned on or off. Hydraulic switch 220 may be any type of hydraulic switch, such as a solenoid-based switch. One of hydraulic-powered components 224 included in hydraulic circuit 204 is shown to be a hydraulic propulsion system 226, which may include a propeller, ducted fan, thruster or any other thrust generation source. Hydraulic circuit 204 may also contain any number or type of additional hydraulic-powered components 228.

As hydraulic fluid 206 leaves either bypass conduit 222 or hydraulic circuit 204, hydraulic fluid 206 passes through a filter 230, upstream of engine cooling circuit 202, which filters hydraulic fluid 206 entering engine cooling circuit 202. Hydraulic fluid 206 may then pass through a heat exchanger 232, also upstream of engine cooling circuit 202, to cool hydraulic fluid 206 entering engine cooling circuit 202. Hydraulic fluid 206 may also experience a temperature decrease prior to reaching heat exchanger 232 due to expansion while powering hydraulic-powered components 224. A conduit split 234 upstream of engine cooling circuit 202 directs hydraulic fluid 206 to either or both of a pre-engine cooling circuit conduit 236 or a reservoir return conduit 238. Excess pressure may be directed toward reservoir return conduit 238 at conduit split 234 so that engine cooling circuit 202 receives hydraulic fluid 206 at a lower desired pressure. For example, engine cooling system 200 may be designed so that engine cooling circuit 202 receives hydraulic fluid 206 at a predetermined hydraulic fluid pressure, and hydraulic fluid pressure in excess of the predetermined hydraulic fluid pressure may be directed into reservoir return conduit 238 so that pre-engine cooling circuit conduit 236 receives hydraulic fluid 206 at the predetermined hydraulic fluid pressure. In some embodiments, the area around conduit split 234 may be a low-pressure environment, in which case a restrictor plate (not shown) may be located at reservoir return conduit 238 to boost the pressure of hydraulic fluid 206 entering pre-engine cooling circuit conduit 236. In other embodiments, the area around conduit split 234 may be a high pressure environment, in which case a restrictor plate, or other pressure-reducing component, may be located at pre-engine cooling circuit conduit 236 to prevent over-pressurization of engine cooling circuit 202.

An orifice 240 may be located in the pre-engine cooling circuit conduit 236, upstream of engine cooling circuit 202, to control the pressure of hydraulic fluid 206 entering engine cooling circuit 202. For example, if the pressure of hydraulic fluid 206 flowing toward engine cooling circuit 202 is too high, orifice 240 may reduce the pressure of hydraulic fluid 206 to prevent damage to engine 210 or engine cooling circuit 202. Orifice 204 may have a static or adjustable opening. In other embodiments, a pressure relief valve or restrictor plate may be used instead of, or in addition to, orifice 240. A thermostat 242 upstream of engine cooling circuit 202 monitors the temperature of engine 210 and controls the flow of hydraulic fluid 206 into engine cooling circuit 202 based on the temperature of engine 210. For example, if thermostat 242 detects that engine 210 has not yet reached operating temperature, thermostat 242 may prevent hydraulic fluid 206 from flowing into engine cooling circuit 202. Once the operating temperature, or any other desired temperature threshold, is reached, thermostat 242 may determine an amount of hydraulic fluid 206 to release into engine cooling circuit 202.

While filter 230, heat exchanger 232, orifice 240 and thermostat 242 are shown in a particular order upstream of engine cooling circuit 202, these components may be fluidly interposed anywhere between hydraulic circuit 204 and engine cooling circuit 202 such that hydraulic fluid 206 from either bypass conduit 222 or hydraulic circuit 204 passes through any number or combination of these components, in any order, to control the pressure, temperature and flow to engine cooling circuit 202. Hydraulic fluid 206 passing through engine cooling circuit 202 absorbs or removes heat from engine 210, thereby cooling engine 210. A heat exchanger 244, located downstream from engine cooling circuit 202 and upstream of reservoir 212, removes heat from hydraulic fluid 206 so that hydraulic fluid 206 exiting engine cooling circuit 202 is cool before being released back into reservoir 212. A pressure relief valve 246 may be fluidly coupled to reservoir 212 to release any excess pressure from reservoir 212.

While the illustrated embodiment depicts engine cooling circuit 202 downstream from hydraulic circuit 204, in other embodiments engine cooling circuit 202 may be upstream of hydraulic circuit 204. In some embodiments, engine cooling system 200 may be used in conjunction with an engine cooling anticipation system such that hydraulic fluid 206 is released into engine cooling circuit 202 based on, for example, the position of the throttle of the aircraft to anticipate any temperature rise in engine 210. The illustrative embodiments may also be used to cool any power source, or portion thereof, of an aircraft. For example, hydraulic fluid 206 may be directed toward a hydraulic oil heat exchanger to cool turbine engine oil. "Fluid communication," as that term is used herein, encompasses, but is not limited to, selective fluid communication. For example, if component A is fluidly connected to component B by a fluid conduit or if component A is in selective fluid communication with component B by virtue of a closable valve disposed along the fluid conduit between components A and B, then components A and B are in "fluid communication" with one another.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An engine cooling system for a rotorcraft comprising:
   an engine having an engine cooling circuit;
   a single hydraulic pump powered by the engine to pump hydraulic fluid;
   a hydraulic circuit in fluid communication with the hydraulic pump and the engine cooling circuit, the hydraulic circuit providing hydraulic power to at least one hydraulic propulsion system each including a hydraulic motor and a propeller, the hydraulic motor operable to provide rotational energy to the propeller;
   a bypass conduit configured to bypass the hydraulic circuit;
   a thermostat coupled to an inlet side of the engine and the engine cooling circuit, the thermostat configured to monitor a temperature of the engine and control a flow of the hydraulic fluid into the engine cooling circuit based on the temperature;
   a pre-engine cooling circuit filter upstream of the engine cooling circuit and the thermostat, the bypass conduit and the hydraulic circuit both feeding into the pre-engine cooling circuit filter, the pre-engine cooling circuit filter operable to filter the hydraulic fluid entering the engine cooling circuit and the thermostat;
   a pre-engine cooling circuit heat exchanger operable to cool the hydraulic fluid entering the engine cooling circuit;
   a conduit split upstream from the engine cooling circuit, the conduit split directing the hydraulic fluid to at least one of a pre-engine cooling circuit conduit and a reservoir return conduit;
   an orifice upstream of the engine cooling circuit, the orifice operable to control a pressure of the hydraulic fluid entering the engine cooling circuit;
   a reservoir in fluid communication with the hydraulic pump, the reservoir operable to contain non-circulating hydraulic fluid; and
   a post-engine cooling circuit heat exchanger downstream from the engine cooling circuit and upstream of the reservoir, the heat exchanger operable to cool the hydraulic fluid exiting the engine cooling circuit;
   wherein components of the engine cooling system are fluidly coupled to one another in the following upstream to downstream order: (1) the pre-engine cooling circuit filter, (2) the pre-engine cooling circuit heat exchanger, (3) the conduit split, (4) the orifice, (5) the thermostat, (6) the engine cooling circuit, (7) the post-engine cooling circuit heat exchanger, (8) the reservoir and (9) the single hydraulic pump; and
   wherein the hydraulic pump is adapted to solely pump the hydraulic fluid through both the hydraulic circuit including the at least one hydraulic propulsion system and the engine cooling circuit, thereby cooling the engine.

2. The engine cooling system as recited in claim 1 wherein the engine cooling circuit is downstream from the hydraulic circuit.

3. The engine cooling system as recited in claim 1 wherein the hydraulic pump is adapted to selectively pump the hydraulic fluid through the hydraulic circuit, the engine cooling system further comprising:
   a bypass assembly including a hydraulic switch and the bypass conduit;
   wherein the hydraulic switch is fluidly interposed between the hydraulic pump and the hydraulic circuit, the hydraulic switch movable between a plurality of switch positions including a bypass switch position to direct the hydraulic fluid into the bypass conduit to bypass the hydraulic circuit.

4. The engine cooling system as recited in claim 1
   wherein the engine cooling circuit is adapted to receive the hydraulic fluid at a predetermined hydraulic fluid pressure; and
   wherein hydraulic fluid pressure in excess of the predetermined hydraulic fluid pressure is directed toward the reservoir return conduit.

5. The engine cooling system as recited in claim 1 wherein the orifice further comprises at least one of a pressure relief valve and a restrictor plate.

6. The engine cooling system as recited in claim 1 wherein the engine cooling circuit runs in parallel to the hydraulic circuit.

7. The engine cooling system as recited in claim 1 wherein the hydraulic fluid is an oil-based fluid.

8. The engine cooling system as recited in claim 1 wherein the thermostat is configured to reduce the flow of the hydraulic fluid into the engine cooling circuit when the temperature of the engine is below a temperature threshold.

9. The engine cooling system as recited in claim 8 wherein the temperature threshold is an operating temperature of the engine.

10. An aircraft comprising:
    a fuselage;
    at least one engine having an engine cooling circuit;
    a single hydraulic pump powered by the at least one engine to pump hydraulic fluid;
    a hydraulic circuit in fluid communication with the hydraulic pump and the engine cooling circuit, the hydraulic circuit providing hydraulic power to at least one hydraulic propulsion system each including a hydraulic motor and a propeller, the hydraulic motor operable to provide rotational energy to the propeller;
    a bypass conduit configured to bypass the hydraulic circuit;
    a thermostat coupled to an inlet side of the at least one engine and the engine cooling circuit, the thermostat configured to monitor a temperature of the at least one engine and control a flow of the hydraulic fluid into the engine cooling circuit based on the temperature; and
    a pre-engine cooling circuit filter upstream of the engine cooling circuit and the thermostat, the bypass conduit and the hydraulic circuit both feeding into the pre-engine cooling circuit filter, the pre-engine cooling circuit filter operable to filter the hydraulic fluid entering the engine cooling circuit and the thermostat;
    a pre-engine cooling circuit heat exchanger operable to cool the hydraulic fluid entering the engine cooling circuit;
    a conduit split upstream from the engine cooling circuit, the conduit split directing the hydraulic fluid to at least one of a pre-engine cooling circuit conduit and a reservoir return conduit;
    an orifice upstream of the engine cooling circuit, the orifice operable to control a pressure of the hydraulic fluid entering the engine cooling circuit;
    a reservoir in fluid communication with the hydraulic pump, the reservoir operable to contain non-circulating hydraulic fluid; and
    a post-engine cooling circuit heat exchanger downstream from the engine cooling circuit and upstream of the reservoir, the heat exchanger operable to cool the hydraulic fluid exiting the engine cooling circuit;

wherein components of the engine cooling system are fluidly coupled to one another in the following upstream to downstream order: (1) the pre-engine cooling circuit filter, (2) the pre-engine cooling circuit heat exchanger, (3) the conduit split, (4) the orifice, (5) the thermostat, (6) the engine cooling circuit, (7) the post-engine cooling circuit heat exchanger, (8) the reservoir and (9) the single hydraulic pump; and wherein the hydraulic pump is adapted to solely pump the hydraulic fluid through both the hydraulic circuit including the at least one hydraulic propulsion system and the engine cooling circuit, thereby cooling the at least one engine.

11. The aircraft as recited in claim 10 wherein the aircraft further comprises a rotorcraft having a distributed hydraulic propulsion system.

12. The aircraft as recited in claim 11 wherein the rotorcraft further comprises a closed wing rotorcraft, the closed wing rotorcraft further comprising:

a closed wing surrounding the fuselage, the closed wing including the distributed hydraulic propulsion system.

13. The aircraft as recited in claim 10 wherein each hydraulic propulsion system includes a hydraulic controller operable to regulate a speed of the hydraulic motor.

14. The aircraft as recited in claim 10 wherein the aircraft further comprises a tail sitter aircraft convertible between a vertical takeoff and landing flight mode and a forward flight mode, the tail sitter aircraft further comprising:

a closed wing surrounding the fuselage; and a plurality of spokes connecting the closed wing to the fuselage;

wherein the at least one hydraulic propulsion system further comprises a plurality of hydraulic propulsion systems distributed on the closed wing and the spokes; and wherein the closed wing and the spokes each form an airfoil shape.

\* \* \* \* \*